United States Patent [19]
Rhode

[11] Patent Number: 5,102,153
[45] Date of Patent: Apr. 7, 1992

[54] SNOW CYCLE ATTACHMENT FOR A BICYCLE FRAME

[76] Inventor: Randall E. Rhode, W7149 N. Shore Dr., Portage, Wis. 53901

[21] Appl. No.: 650,902

[22] Filed: Feb. 5, 1991

Related U.S. Application Data

[63] Continuation-in-part of Ser. No. 583,510, Sep. 17, 1990, abandoned.

[51] Int. Cl.5 .............................................. B62M 27/02
[52] U.S. Cl. ................................... 280/7.14; 180/185; 180/9.21; 180/9.26; 280/12.1
[58] Field of Search ..................... 280/7.12, 7.14, 7.15, 280/12.1, 12.12, 12.13, 12.14, 28.5; 180/9.3, 9.21, 9.26, 9.25, 183, 184, 185

[56] References Cited

U.S. PATENT DOCUMENTS

| | | | |
|---|---|---|---|
| 654,291 | 7/1900 | Stith | 180/9.25 X |
| 1,068,883 | 7/1913 | Frank | 180/9.25 X |
| 3,412,820 | 11/1968 | Wachholz | 180/9.26 |
| 3,412,821 | 11/1968 | Humphrey | 180/9.21 X |
| 3,885,641 | 5/1975 | Harris | 180/185 |
| 4,534,437 | 8/1985 | Howerton et al. | 180/185 |

FOREIGN PATENT DOCUMENTS

| | | | |
|---|---|---|---|
| 0458162 | 7/1949 | Canada | 280/12.14 |
| 2556303 | 6/1985 | France | 280/12.1 |

Primary Examiner—Andres Kashnikow
Assistant Examiner—Michael Mar
Attorney, Agent, or Firm—Foley & Lardner

[57] ABSTRACT

A kit for connecting a multiple speed bicycle to a multiple speed snow cycle, the kit including a ski assembly adapted to be mounted on the handlebar column, a drive device mounted on the rear axle and being operatively connected to the bicycle sprocket through a multiple speed derailleur and a dual belt drive assembly mounted on the bicycle below the rear axle, the drive assembly being connected to the drive device to propel the snow cycle on rotation of the sprocket.

19 Claims, 6 Drawing Sheets

SNOW CYCLE ATTACHMENT FOR A BICYCLE FRAME

RELATED APPLICATION

This application is a continuation-in-part of my copending application Ser. No. 07/583,510 entitled, "Snow Cycle Attachment for a Bicycle Frame," filed on Sept. 17, 1990, and now abandoned.

FIELD OF THE INVENTION

The present invention relates generally to a vehicle for traveling on snow and more particularly to a conversion kit for converting a bicycle to a snow cycle.

BACKGROUND OF THE INVENTION

Bicycles of various types are used extensively for recreation and sport. However, conversion kits are available for adapting a bicycle for use on snow. These kits are generally limited to the addition of skis to the front and rear of the frame. Vehicles of this type are shown in U.S. Pat. Nos. 3,561,783 and 4,027,891. This type of bike is difficult to balance because of the single ski arrangement. Power driven cycles have also been designed such as shown in U.S. Pat. Nos. 3,814,198 and 3,915,468. Both of these bikes are limited to snow travel.

SUMMARY OF THE INVENTION

The present invention advantageously provides an attachment kit which can be substituted for the wheels of a bicycle and driven indirectly or directly off of the chain drive assembly of the bicycle. Conversion of the bicycle to a winter sport vehicle extends its use to a full year.

One of the primary advantages of the invention is the ability to quickly and easily convert a multispeed bicycle to a multi-speed snow cycle. This is accomplished by merely removing the wheels from the bicycle and attaching the belt drive assembly to the frame. The belt drive assembly can then be advantageously connected to use the multiple speed derailleur as well as the hand brake, both of which can be operated off of the handlebars.

A further advantage of the invention is the improved stability of the snow cycle provided by a dual belt drive assembly which straddles the frame and engages the snow on each side of the rear wheel.

Other advantages of the present invention and a fuller understanding of the operation and the system which it implements will be appreciated upon examination of the detailed description which follows, taken in conjunction with the accompanying drawings and the appended claims.

Figure 1:
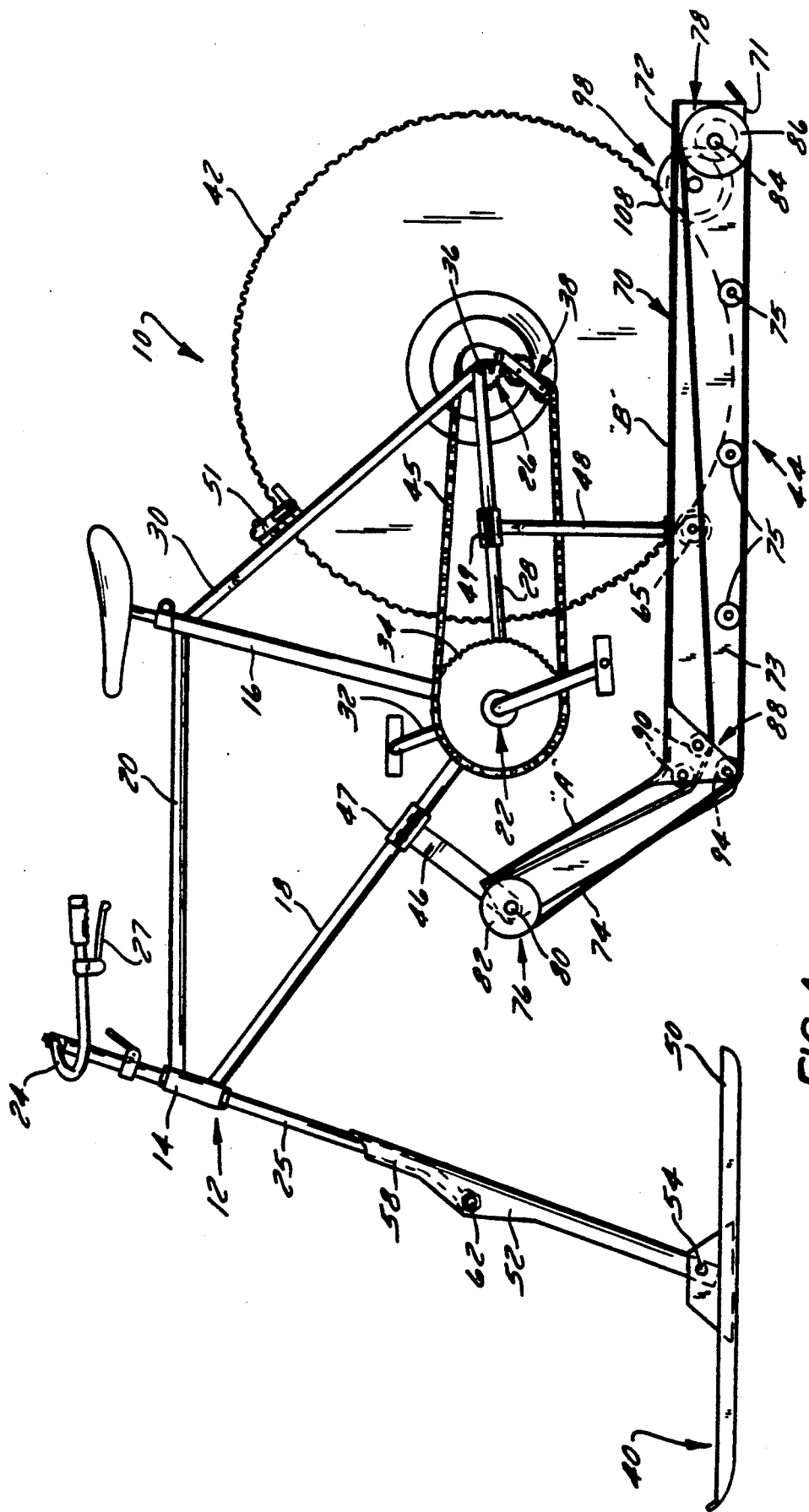
FIG. 1 is a side elevation view of the snow cycle showing the belt drive assembly mounted on the frame.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purposes of description and should not be regarded as limiting.

DETAILED DESCRIPTION OF THE PREFERRED EMBODIMENTS

The snow cycle 10 according to the present invention utilizes a bicycle frame 12 in the form of a parallelogram having a tubular steering support column 14, a tubular seat support column 16, a tubular pedal axle support column 18, and a tubular cross bar 20. The cross bar 20 is connected at one end to the steering column 14 and at the other end to the seat support column 16. The axle support column 18 is connected at the upper end to the steering support column 14 and at the lower end to the pedal axle housing 22. The seat support column 16 is connected to the axle housing 22. A handlebar 24 is connected to a front fork 25 which is mounted in the steering column 14. A rear axle housing 26 is supported at the rear of the frame 12 by a rear fork 28 connected to the pedal axle housing 22. A pair of diverging tubular support members 30 are connected to the seat support column 16 and to the axle housing 26. A pedal crank 32 is mounted for rotary motion in housing 22 to drive a sprocket 34. A rear wheel axle 36 is mounted in rear axle housing 26. The multiple speed derailleur 38 is left on the rear axle 36.

In accordance with the invention, the belt drive assembly includes a front ski attachment 40 secured to the steering fork 25 and a drive disc 42 mounted on the rear axle 36. A belt drive attachment 44 is secured to the frame 12 by means of a pair of front brackets 46 and a pair of rear support brackets 48. The front brackets 46 are secured to column 18 by cap 47. The rear brackets 48 are secured to the rear forks 28 by caps 49. The sprocket 34 is connected to the derailleur 38 by means of a chain 45 which is used to drive the drive disc 42 in a conventional manner.

The drive disc 42 can be formed of various material such as a plastic or metal having a thickness corresponding to the width of the wheel rim. With this arrangement, the standard caliper brake 51 used on the bicycle can be left on the frame 12 in a position to engage the drive disc 42 and can be operated from the handgrip 27 on the handlebar.

Figure 3:
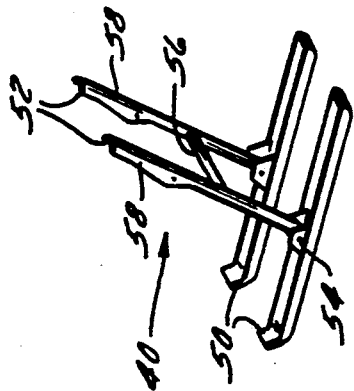
FIG. 3 is a view of the front ski attachment.
Figure 4:
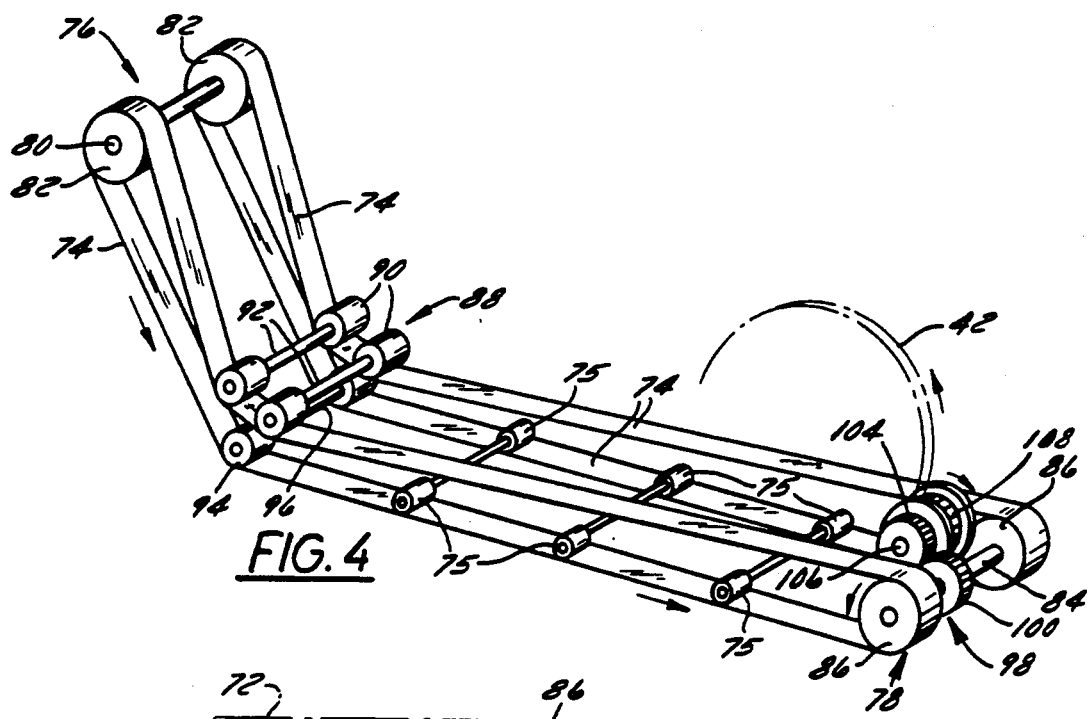
FIG. 4 is a perspective view of the belt drive gear.
Figure 5:
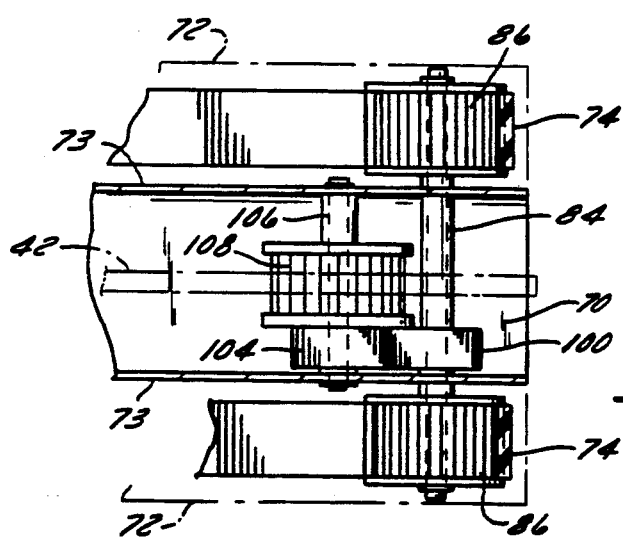
FIG. 5 is a top view of the pulley drive gear assembly.
Figure 6:
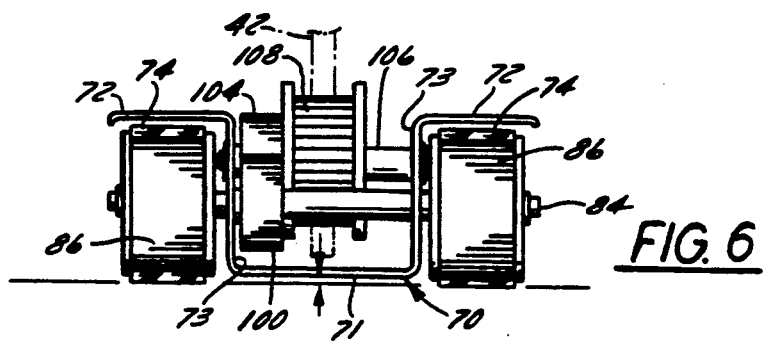
FIG. 6 is a rear view of the pulley drive gear assembly.
Figure 7:
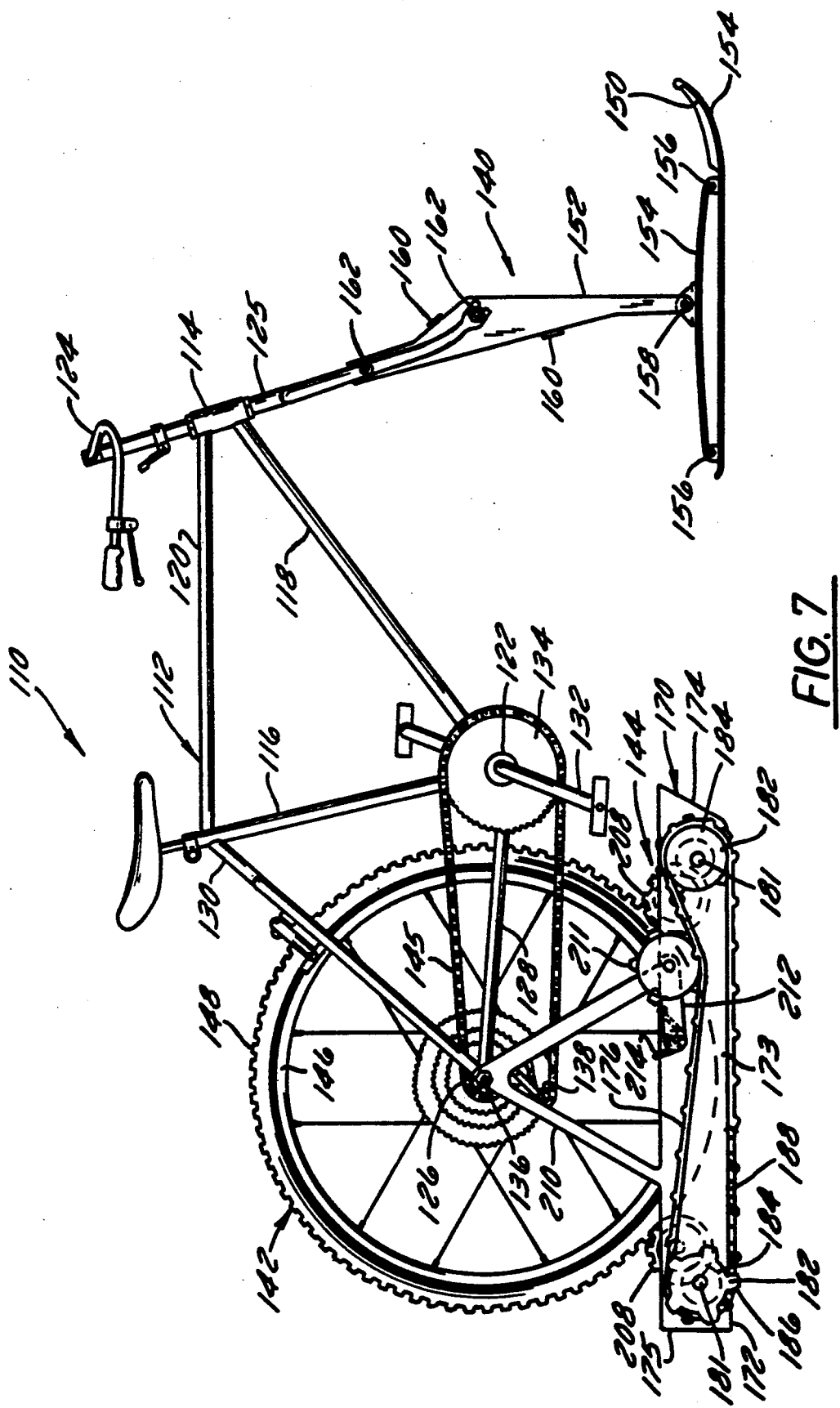
FIG. 7 is a side elevation view of a modified snow cycle having a modified drive assembly.

The front ski attachment 40 as seen in FIG. 3 includes a pair of skis 50 pivotally mounted to the ends of vertical frame members 52 by means of pins 54. The frame members are interconnected by a crossbar 56. Each frame member includes a channel 58 at the upper end which matingly engages the back of the fork 25. The frame members are secured to the fork 25 by the front axle 62 which passes through the axle hub in the front fork 25.

Figure 2:
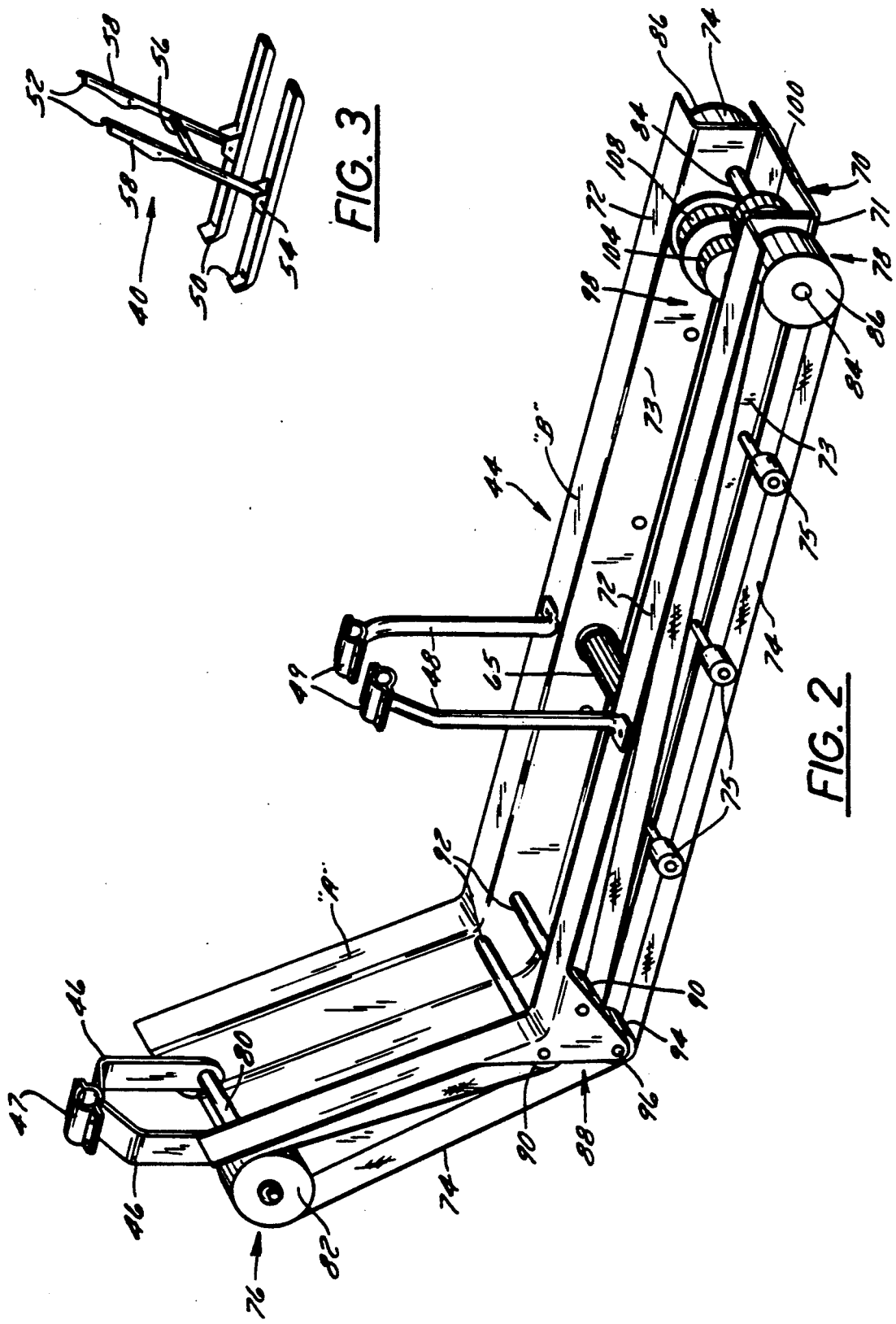
FIG. 2 is a perspective view of dual belt drive attachment.

The belt drive attachment 44 as shown in FIG. 2 includes a pan 70 in the form of a "U" having an elongate base 71 a pair of side walls 73 and flanges 72 extending horizontally outwardly from each of the side walls 73 of the shaped pan. The front portion "A" of the pan 70 is angled upwardly from the rear portion "B" to engage any irregular surfaces, drifts or depressions, in the surface of the snow. A pair of belts 74 are supported on the sides of pan 70 by means of pulley assemblies 76 and 78 which are journalled for rotation in the front and back of pan 70. The base 71 of the pan 70 should be spaced upwardly from the belts 74 so that it does not ride on the snow except to provide additional support in soft snow. The pulley assembly 76 includes a shaft 80 which is journalled in the pan 70 at the forward or front end of the assembly and a pair of pulleys 82. The rear pulley assembly 78 includes a shaft 84 which is journalled in the back of pan 70 and a pair of pulleys 86.

A set of idler roll assemblies 88 are mounted on each side of the pan to guide the belts 74 around the front portion "A" and rear portion "B" of the pan 70. Each idler assembly includes two pair of rollers 90 mounted on axles 92 which bear against the top of the upper belt 74, and a single pair of idler rolls 94 mounted on axles 96 is provided on the upper surface of the lower belt 74. Guide rollers 75 are provided along each side of the pan to maintain the belts 74 in engagement with the snow.

The belts 74 are driven by means of a drive gear assembly 98 mounted in pan 70. The gear assembly 98 connects the drive disc gear 42 to the rear pulley assembly 78. The gear assembly 98 includes a pinion gear 100 mounted on shaft 84 which is driven by means of a drive gear 104 mounted on a shaft 106 in pan 70. A cogwheel 108 is mounted on the shaft 106 in a position to engage and support the drive disc 42. The cogwheel 108 and pulley 86 have the same diameter. The drive disc 42 can be supported in the pan 70 by means of an idler gear 65 provided in the front of disc 42. A direct drive could also be used to rotate the belts if desired. With this arrangement the gear assembly could be eliminated, by connecting the drive disc directly to the gear 100 via a belt or chain.

A modified snow cycle 110 as shown in FIGS. 7-12 utilizes a bicycle frame 112 of the type shown in FIG. 1. The frame generally includes a tubular steering support column 114, a tubular support seat column 116 and a tubular pedal axle support column 118 and a tubular cross bar 120. Cross bar 120 is connected at one end to the steering column 114 at the other end to the seat support column 116. The axle support column 118 is connected at the upper end to the steering support column 114 and at the lower end to the pedal axle housing 122. The seat support column 116 is connected to the axle housing 122. The handle bar 124 is connected to the front fork 125 which is mounted in the steering column 114. A rear axle housing 126 is supported at the rear of the frame 112 by a rear fork 128 connected to the pedal axle housing 122. A pair of diverging tubular support members 130 are connected to the seat support column 116 and to the axle housing 126. The pedal crank 132 is mounted for rotary motion in housing 122 to drive a sprocket 134. A rear axle 136 is mounted in the rear axle housing 126. A multiple speed derailer 138 may be provided on the rear axle 136.

In accordance with the invention the modified front ski attachment 140 is secured to the steering fork 125.

Figure 8:
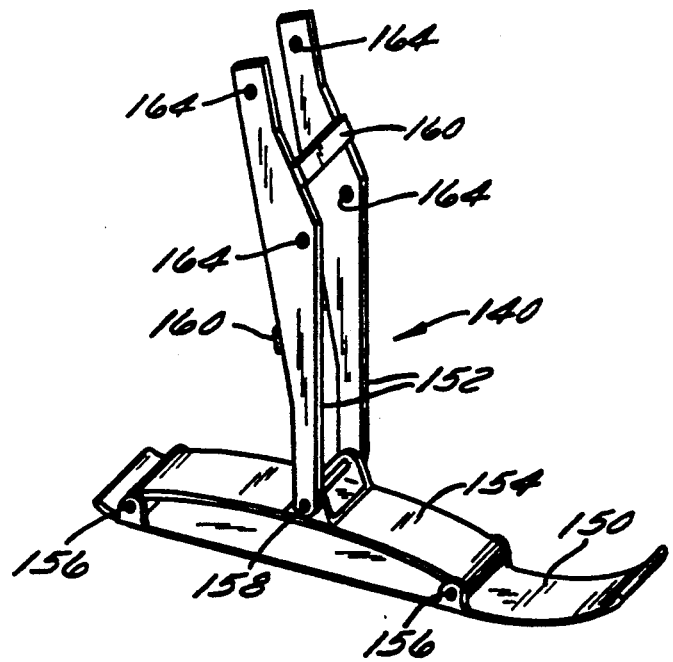
FIG. 8 is a perspective view of the front ski.

Referring to FIG. 8 the front ski attachment 140 includes a single ski 150 pivotally mounted to the ends of vertical frame members 152. The ski includes a leaf spring 154 which is connected to the ski by pins 156 and to the frame members 152 by a pin 158. The frame members 152 are connected by cross members 160 and are secured to the front fork by pins 162 which pass through the holes 164 in the frame member.

Figure 9:
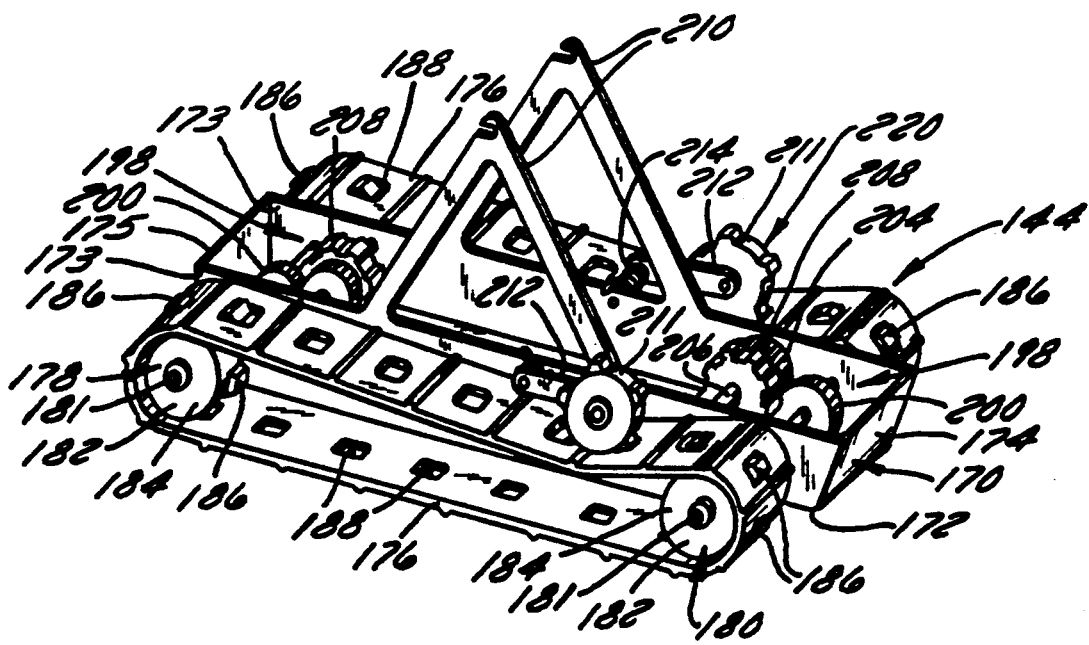
FIG. 9 is a perspective view of the rear drive assembly.
Figure 10:
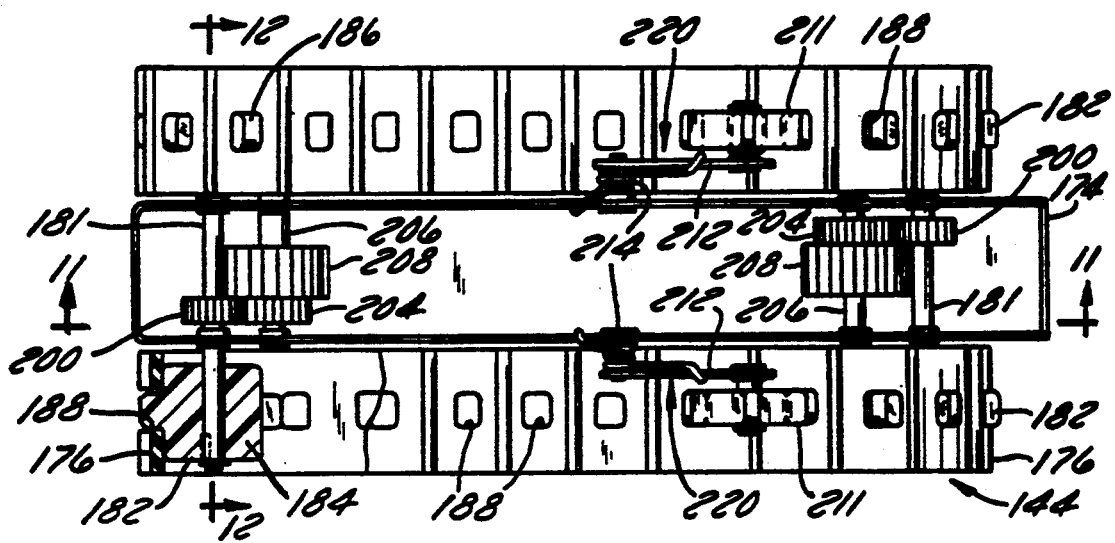
FIG. 10 is a top view partly in section of the modified drive assembly.
Figure 11:
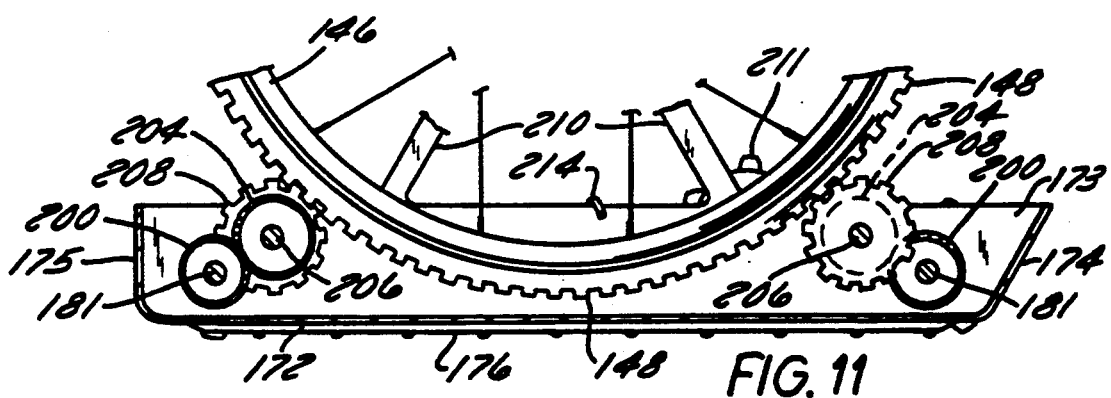
FIG. 11 is a view taken on line 11—11 of FIG. 10 showing the wheel drive.
Figure 12:
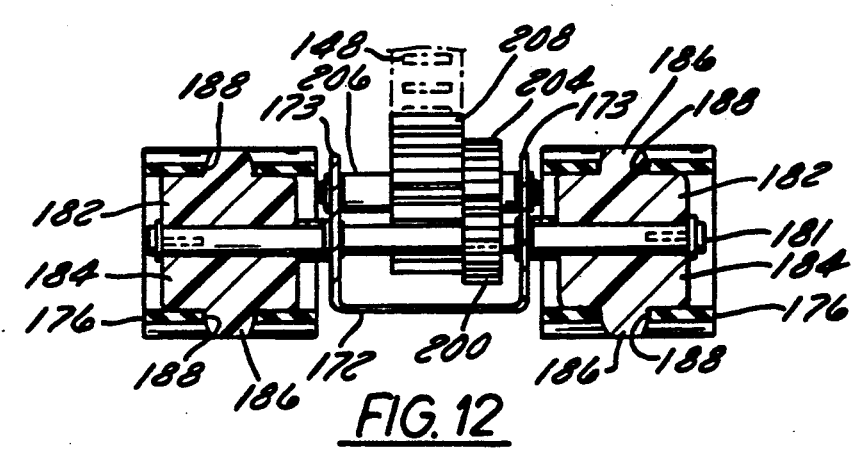
FIG. 12 is a view taken on line 12—12 of FIG. 10 showing the belt drive assembly.

The modified belt drive attachment 144 as shown in FIG. 9 includes a pan 170 having a elongated base 172 and a pair of sidewalls 173. The pan is closed on the front by a wall 174 which angles upwardly from the pan 172 and a rear wall 175. A pair of belts 176 are supported on the sides of the pan 170 by means of pulley assemblies 178 and 180. The base 172 of the pan 170 should be spaced upwardly from the belts 176 so that it does not ride on the snow except to provide additional support in soft snow. The pulley assemblies 178 and 180 each include a shaft 181 which are mounted in the front and back of the pan 170 and a pair of pulleys 182 mounted on the end of each of the shafts 181. Each of the drive pulleys 182 includes a cog wheel 184 having teeth 186 which matingly engage corresponding rectangular openings 188 in each of the belts 176.

The belts 176 are driven by means of drive gear assemblies 198 mounted in the pan 170. Each drive gear assembly 198 includes a pinion gear 200 mounted on the shaft 181 which is driven by means of a drive gear 204 mounted on a shaft 206 in the pan 170. A cog wheel 208 is mounted on each of the shafts 206. The belt drive attachment 144 is mounted on the rear axle 136 by means of a pair of triangular shaped supports 210 connected to the side walls 173 of pan 170.

The belt drive attachment 144 is driven by means of a drive wheel assembly 142 which includes the rear bicycle wheel 146 and a cog type timing belt 148. In this regard, the timing belt 148 replaces the tire on the wheel 146. The timing belt can take a number of forms one of which would be a "tire" which has been molded with cogs similar to the cogs of the timing belt 148. This advantageously provides a much lighter drive wheel at lower cost and eliminates the requirement of removing the bicycle wheel and substituting a cog wheel. The tire can also be in the form of an inflatable type belt 148 which can be inflated to hold it in place on the wheel. The timing belt 148 will ride on the cog wheels 208 thus providing drive for the belts at both the front and the back of the belt drive attachment 144.

The drive means could also take the form of a double chain drive. In this regard, the rear wheel of the bicycle is removed and a wheel sprocket is mounted on the rear axle which is driven by the bicycle chain. A drive sprocket is mounted on the rear axle on each side of the wheel sprocket. The drive sprockets are then connected to the cog wheels 208 by chains. Although two drive sprockets are described, a single sprocket could also be used. It is also within the contemplation of the invention to use belts in place of chains. Pulleys would be substituted for the cog wheels 208 and drive sprockets.

A pair of idler rolls 220 are provided on the drive belt attachment 144 to take up the slack and maintain the belt's tension. In this regard each of idler rolls 211 is mounted on a pivot arm 212 which is pivotally connected to the pan and biased by means of springs 214 into engagement with the belt.

Thus, it should be apparent that there has been provided in accordance with the present invention a snow cycle attachment for a bicycle frame that fully satisfies the aims and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiment of the invention in which an exclusive property or privilege is claimed are defined as follows:

1. A snow cycle assembly for converting a bicycle to a snow cycle, the bicycle including a frame having a front fork for supporting a front wheel and a rear fork for supporting a rear wheel, a handle attached to said front fork, a seat, a rear axle supported by said rear fork, and a sprocket drive assembly operatively connected to said rear axle, said snow cycle assembly comprising:
   a ski attachment adapted to be secured to said front fork in place of said front wheel,
   a drive disc having a diameter substantially the same as that of said rear wheel and adapted to be mounted on said rear axle in place of said rear wheel and be operatively connected to said sprocket drive assembly, and
   a belt drive assembly adapted to be attached to the frame at a location below said rear axle, said belt drive assembly including an endless belt, an idler gear for supporting said drive disc, and a gear assembly for connecting said drive disc to said endless belt, said gear assembly including a cogwheel having a plurality of gear teeth for engagement with a plurality of gear teeth located along an outer circular periphery of said drive disc, whereby rotation of said drive disc will drive said belt drive assembly.

2. The assembly according to claim 1, wherein said belt drive assembly includes a channel member, a pair of pulleys mounted for rotary motion at each end of said channel member, and a pair of said belts being mounted on said pulleys for supporting the bicycle frame on snow, said gear assembly connecting said drive disc to one pair of said pulleys whereby rotary motion of said drive disc is transferred through said gear assembly to said belts.

3. The assembly according to claim 2 wherein said gear assembly includes a pinion gear connected to said one pair of pulleys and gear means for transferring the rotary motion of said drive disc to said pinion gear.

4. The assembly according to claim 3 including a number of support rollers on the outside of said channel member for maintaining said belts in engagement with the snow.

5. The assembly according to claim 4 wherein said channel member includes a front portion and a rear portion, said front portion angled upwardly from said rear portion for engaging irregular snow surfaces.

6. The assembly according to claim 5 wherein said other of said pair of pulleys is located at the upper end of said front portion for supporting said belts for rotation on each side of said front portion.

7. The assembly according to claim 6 including a set of idler rolls mounted on each side of said channel member at the intersection of said front portion with said rear portion to guide said belts along the sides of the channel member.

8. A snow cycle assembly for converting a mountain bicycle frame to a snow cycle, the frame generally including a front fork for supporting a front wheel and a rear fork for supporting a rear wheel, a handle assembly mounted on said front fork, a seat, a rear axle supported by said rear fork and a pedal driven sprocket drive assembly operatively connected to said rear axle, said kit snow cycle assembly comprising:
   a dual ski attachment mounted on said front fork in place of said front wheel,
   a drive disc mounted on the rear axle in place of said rear wheel and being operatively connected to the sprocket drive assembly,
   a dual belt drive assembly adapted to be mounted on the frame below said drive disc, said belt drive assembly including a pan having an elongate base, a side wall on each side of said base, a pulley assembly mounted at each end of said side walls and a belt supported on said pulley assemblies on each side of said pan, and
   means for connecting said drive disc to said dual belt drive assembly whereby said belt drive assembly can be driven by the sprocket drive assembly.

9. The assembly according to claim 8 wherein said connecting means includes a pinion gear on one of said pulley assemblies, a drive gear mounted in said pan in operative engagement with said pinion gear and a cogwheel connected to said drive disc and said drive gear.

10. The assembly according to claim 8 including a number of support rollers on each side of said pan for guiding the belts along each side of said pan.

11. The assembly according to claim 8 wherein said pan includes a first portion and a second portion, said first portion being angled upwardly from said second portion and a set of idle rolls on each side of said pan at the intersection of said first portion with said second portion for guiding said belts around the intersection of said first portion with the second portion.

12. A snow cycle assembly for converting a bicycle to a snow cycle, the bicycle including a frame having a front fork for supporting a front wheel and a rear fork for supporting a rear wheel, a handle assembly attached to the front fork, a seat, a rear axle supported by the rear fork, a rear wheel mounted on the rear axle, and a sprocket drive assembly operatively connected to drive the rear wheel on the rear axle, said assembly comprising:
   a ski attachment attached to the front fork in place of said front wheel,
   a belt drive attachment mounted on the frame below the rear wheel, said belt drive attachment including a channel member, a pair of pulleys mounted for rotary motion at each end of said channel member, a pair of belts mounted on said pulleys on said channel member for supporting the bicycle frame on snow and a gear assembly at each end of said channel member for connecting said drive means to each of said pair of pulleys whereby rotary motion of said rear wheel is transferred through said gear assemblies to said belts, and
   drive means mounted on the rear wheel and being operatively connected to said belt drive assembly, whereby rotation of the rear wheel will drive said belt drive.

13. The assembly according to claim 12 wherein each of said gear assemblies includes a pinion gear connected to one pair of said pulleys and gear means for transferring the rotary motion of said drive means to said pinion gears.

14. The assembly according to claim 13 including an idler roll on each side of said channel member for engaging the top of said belts to maintain tension in said belts.

15. The assembly according to claim 14 wherein said drive means includes a timing belt mounted on said wheel.

16. A snow cycle assembly for converting a bicycle to a snow cycle, the frame generally including a front fork and a rear fork, a handle attached to said front fork, a seat, a rear axle supported by said rear fork and a pedal driven sprocket drive assembly operatively connected to said rear axle, said assembly comprising:
   a ski attachment adapted to be mounted on said front fork,
   a drive disc adapted to be mounted on the rear axle and to be connected to said sprocket drive assembly,
   a dual belt drive assembly mounted on the frame below the rear axle, said belt drive assembly including a pan having an elongate base, a side wall on each side of said base, a dual pulley assembly mounted at each end of said side walls and a belt supported on each of said pulley assemblies on each side of said pan, and
   means for connecting said drive disc to said dual belt drive assembly whereby said belt drive assembly can be driven by the sprocket drive assembly.

17. The assembly according to claim 16 wherein said connecting means includes a pinion gear on each of said pulley assemblies, a drive gear mounted at each end of said pan in operative engagement with said pinion gear, and a cogwheel connected to said drive gear, said drive means includes a wheel mounted on said rear axle and a timing belt mounted on said wheel and positioned to engage said drive gear.

18. The assembly according to claim 16 wherein said connecting means includes a drive gear assembly operatively connected to each of said pulley assemblies; and said drive means comprises a sprocket mounted on the rear axle, a pair of drive sprockets mounted on the rear axle and a chain connecting each of said drive sprockets to one of said drive gear assemblies.

19. The assembly according to claim 16 wherein said drive means comprises a drive pulley mounted on said axle and said connecting means comprises a belt connecting said drive pulley to one of said pulley assemblies in said pan.

* * * * *